(12) United States Patent
DiFoggio (10) Patent No.: US 10,502,849 B1
(45) Date of Patent: Dec. 10, 2019

(54) PSEUDOGAS NEUTRON DETECTOR

(71) Applicant: Baker Hughes, a GE Company, LLC, Houston, TX (US)

(72) Inventor: Rocco DiFoggio, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/041,379

(22) Filed: Jul. 20, 2018

(51) Int. Cl.
| | |
|---|---|
| *G01T 3/00* | (2006.01) |
| *G01V 5/12* | (2006.01) |
| *G01V 5/10* | (2006.01) |

(52) U.S. Cl.
CPC .............. *G01T 3/008* (2013.01); *G01V 5/107* (2013.01); *G01V 5/125* (2013.01)

(58) Field of Classification Search
CPC ......... G01T 3/008; G01V 5/125; G01V 5/107
USPC ........... 250/390.01, 390.04, 269.6, 391, 256, 250/269.4, 370.05
See application file for complete search history.

(56) References Cited

U.S. PATENT DOCUMENTS

| | | | | |
|---|---|---|---|---|
| 7,714,297 B2* | 5/2010 | Morris | ................... | G01N 23/20 250/393 |
| 7,952,078 B2* | 5/2011 | McCormick | ............ | G01T 3/008 250/390.01 |
| 2003/0213917 A1* | 11/2003 | Menlove | .................... | G01T 3/00 250/390.01 |
| 2005/0258373 A1* | 11/2005 | Lacy | ........................ | G01T 1/185 250/390.01 |
| 2006/0017000 A1* | 1/2006 | Martoff | .................. | G01T 1/2935 250/390.02 |
| 2006/0138340 A1* | 6/2006 | Ianakiev | ................. | G01T 3/008 250/390.01 |
| 2010/0314549 A1* | 12/2010 | Wang | ........................ | G01T 3/00 250/390.01 |
| 2011/0116589 A1* | 5/2011 | Lustig | ..................... | G01T 3/008 376/254 |
| 2011/0266643 A1* | 11/2011 | Engelmann | ............... | G01T 3/08 257/429 |
| 2012/0049054 A1* | 3/2012 | Zhou | ...................... | B82Y 15/00 250/265 |
| 2012/0217406 A1* | 8/2012 | McGregor | ................ | G01T 3/00 250/361 R |
| 2012/0223242 A1* | 9/2012 | Brown | .................... | G01T 3/008 250/391 |

(Continued)

OTHER PUBLICATIONS

Gordon Fern, "What Goes Up Does Not Necessarily Come Down: Understanding the risks presented by nanoplatelets in the workplace," Institute of Occupational Medicine, Apr. 25-28, 2016, The Chartered Society of Worker Health Protection, 10 pages.

(Continued)

*Primary Examiner* — David P Porta
*Assistant Examiner* — Blake C Riddick
(74) *Attorney, Agent, or Firm* — Hogan Lovells US LLP (57) ABSTRACT

Embodiments of the present disclosure include a system for detecting neutrons with a housing, a gas chamber at least partially defined by the housing, an anode extending through at least a portion of the gas chamber, and a pseudogas arranged within the gas chamber. The pseudogas comprises a mixture of gas and suspended solid particles that contain an element with a high cross-section for thermal neutron capture.

20 Claims, 6 Drawing Sheets

(56) References Cited

U.S. PATENT DOCUMENTS

| | | | | |
|---|---|---|---|---|
| 2013/0067741 A1* | 3/2013 | Stephan | ............ | H01J 47/1205 29/846 |
| 2013/0091763 A1* | 4/2013 | Rottner | ............ | C01B 35/02 44/504 |
| 2013/0119261 A1* | 5/2013 | McKinny | ............ | G01T 3/008 250/391 |
| 2014/0077092 A1* | 3/2014 | Kopp | ............ | G01T 3/00 250/390.01 |
| 2015/0241577 A1* | 8/2015 | Spillane | ............ | G01T 3/008 250/391 |
| 2015/0355345 A1* | 12/2015 | Neyland | ............ | G01T 3/008 250/385.2 |

OTHER PUBLICATIONS

Vinita J. Ghosh et al., "A feasibility study exploring the use of high-pressure xenon (HPXe) detectors for the characterization of spent fuel bundles," Jun. 2012, Brookhaven National Laboratory, 41 pages.

G. J. Mahler et al., "A Portable Gamma-Ray Spectrometer Using Compressed Xenon," Jun. 1998, IEEE Transactions on Nuclear Science, vol. 45, No. 3, pp. 1029-1033.

S. N. Pyae et al., "Xenon gamma-detector applicability for identification and characterization of radioactive waste," 2015, Physics Procedia, vol. 74, pp. 352-356.

Paul Frame, Oak Ridge Associated Universities, "Boron Trifluoride (BF3) Neutron Detectors," May 10, 2011, https://www.orau.org/ptp/collection/proportional counters/bf3info.htm.

RT Kouzes et al, "BF3 Neutron Detector Tests," Dec. 9, 2009, Pacific Northwest National Laboratory, https://www/.pnnl.gov/main/publications/external/technical_reports/pnnl-19050.pdf.

Sang Lian et al., "Controlled fabrication of ultrathin-shell BN hollow spheres with excellent performance in hydrogen storage and wastewater treatment," Apr. 2012, Energy & Environmental Science, vol. 5, No. 5, pp. 7072-7080, partial article.

Edgar Sanchez Garcia et al., "Argon and xenon scintillation studies with high pressure gas detectors," Sep. 7, 2016, Centro de Investigaciones Energeticas, Medioambientales y Tecnologicas (CIEMAT), Madrid, Spain, 10 pages, http://darkmatter.ciemat.es/documents/585242/809389/EdgarSanchez-TFM.pdf/736d1910-68c8-4190-930b-b24a64fd92f8.

F. Resnati, "Pressurized xenon as scintillator for gamma spectroscopy," Sep. 6, 2013, Journal of Instrumentation, vol. 8, 5 pages.

J.L. Wang, "Boron Carbide Hollow Microspheres Prepared by Polymer Derived Method," 2016, Key Engineering aterials, vol. 726, pp. 159-163 (abstract attached).

* cited by examiner

PSEUDOGAS NEUTRON DETECTOR

BACKGROUND

1. Field of the Invention

The present disclosure relates to downhole measurement devices. More particularly, the present disclosure relates to neutron detectors that may be used in downhole environments.

2. Description of Related Art

During oil and gas operations, various measurements may be acquired downhole in order to evaluate one or more formation properties. In certain situations, nuclear interrogation techniques may be used downhole where a radiation source is emitted into the formation and subsequent radiation (e.g., backscatter, prompt gamma-ray, neutrons, etc.) is measured via a detector located on the tool string. For neutron detection, gas filled helium (He) detectors may be used. Often, the He in these detectors is Helium-3, which may be expensive or difficult to obtain. Alternative neutron detectors are also expensive, toxic, or may be unsuitable for downhole environments.

SUMMARY

Applicant recognized the problems noted above herein and conceived and developed embodiments of systems and methods, according to the present disclosure, for neutron detectors.

In an embodiment, a system for detecting neutrons includes a housing, a gas chamber at least partially defined by the housing, an anode extending through at least a portion of the gas chamber, and a pseudogas arranged within the gas chamber, wherein the pseudogas comprises a mixture of a gas and solid particles.

In an embodiment, a method for forming a neutron detector includes forming a gas chamber, determining a gas to particle ratio for a pseudogas, filling the gas chamber with the pseudogas, and sealing the gas chamber.

In an embodiment, a system for detecting neutrons includes a housing forming a cathode of a proportional gas counter, a gas chamber formed at least partially by the housing, and an anode extending partially through the gas chamber. The system also includes a pseudogas formed from a combination of dense gas and Boron-containing particles positioned within the gas chamber, wherein the Boron-containing particles are arranged to capture incoming neutrons and increase a current at the anode via the production of charged particles from neutron capture.

In an embodiment, a system for detecting neutrons includes a housing, a gas chamber at least partially defined by the housing, an anode extending through at least a portion of the gas chamber, and a pseudogas arranged within the gas chamber. The pseudogas comprises a mixture of gas and solid particles. In an embodiment, the solid particles are hollow and the pressure of the gas is increased to achieve neutral buoyancy of the hollow particles as they float in the gas.

In another embodiment, a method for forming a neutron detector includes forming a gas chamber, determining a gas to particle ratio for a pseudogas, filling the gas chamber with the pseudogas, and sealing the gas chamber. In another embodiment, the particles are nanoparticles which can stay afloat for days or weeks in a gas (very long settling times that depend on particle size and gas density) just from Brownian motion alone without the need for neutral buoyancy.

In an embodiment, a system for detecting neutrons includes a housing forming a cathode of a proportional gas counter. The system also includes a gas chamber formed at least partially by the housing. The system further includes an anode extending partially through the gas chamber. The system also includes a pseudogas formed from a combination of a dense gas and particles having high thermal neutron cross sections positioned within the gas chamber, wherein the particles are substantially uniformly distributed within the gas and they capture incoming thermal neutrons and thereby increase a current at the anode via the production of charged particles from neutron capture. For this disclosure, a dense gas is a gas or a supercritical fluid whose density can be increased with pressure at room temperature so as to match the particle density. In various embodiments, the dense gas is nontoxic and chemically nonreactive, such as the inert gases, Xe or Ar, whose critical temperatures are below room temperature so that they never condense to a liquid at any pressure, no matter how high, whenever that temperature is room temperature or above. Although there are other dense gases, such Sulfur Hexafluoride (critical temperature 45.6 C), $SF_6$ will, at 343 psi, condense to a liquid at 25 C, whose liquid density then changes very little with any further increases in pressure making it hard to match the particle density. The isotope, He-3, has only 0.00014% natural abundance, which is one factor that makes it expensive, and it has a thermal neutron cross section of 5333 barns. In this disclosure, isotopes, which may be used in the solid particles include B-10 (19.9% abundance, 3835 barns), Eu-151 (47.8% abundance, 9100 barns), Cd-113 (12.22% abundance, 20600 barns), Sm-149 (13.9% abundance, 42080 barns), Gd-155 (14.8% abundance, 61100 barns), and Gd-157 (15.7% abundance, 259000 barns). Boron's low atomic weight permits lower density particles either as elemental boron or, in various embodiments, as chemically bonded to another light element such as carbon, nitrogen, or oxygen thereby making lightweight particles for which it is easier to achieve neutral buoyancy (e.g., substantially infinite settling time) in a pressurized gas, especially if the particle is hollow. Another advantage of boron is that the energy released when it captures a neutron is high (2310 keV). It exceeds the 765 keV released when He-3 captures a neutron and it far exceeds the 105 keV released when Gd captures a neutron. Also, B-10 has very low sensitivity to interfering gamma rays. That is why Boron Tetrafluoride ($BF_3$) gas neutron detectors are a common alternative to He-3 gas neutron detectors. Unfortunately, $BF_3$ is both toxic and corrosive and B-10 enriched $BF_3$ is expensive. The number of B-10 nuclei per unit volume of 100% B-10 enriched $BF_3$ at the typical 1.0 atmosphere of $BF_3$ gas pressure that is used can be a factor of 1900 times less than that achieved by embodiments of the present disclosure's natural-abundance, boron-containing-particle pseudogas at the maximum particle concentration.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include systems and methods for detecting radiation in a downhole environment, such as neutrons within a proportional gas counter. In various embodiments, a neutron detector includes a gas chamber that is filled with a pseudogas containing a combination of gas and solid particles, such as substantially hollow particles. In various embodiments, the particles contain Boron and the surrounding gas is Xenon, an inert gas whose high atomic weight permits significant mass density at moderate pressures. In various embodiments, a mass density of the Boron-containing particles may be substantially equal to the Xenon mass density so that the Boron particles can substantially "float" or be suspended within the Xenon gas. As a result, neutrons entering the gas chamber may interact with the substantially uniformly-distributed Boron at a variety of different locations. In various embodiments, the Boron utilized to produce the pseudogas is naturally occurring Boron, which as described herein may be easier to obtain and cheaper than enriched Boron. Furthermore, in various embodiments, the quantity of Boron utilized to create the pseudogas may be particularly selected based on desired properties of the detector, which may be compared to other neutron detectors.

Figure 1:
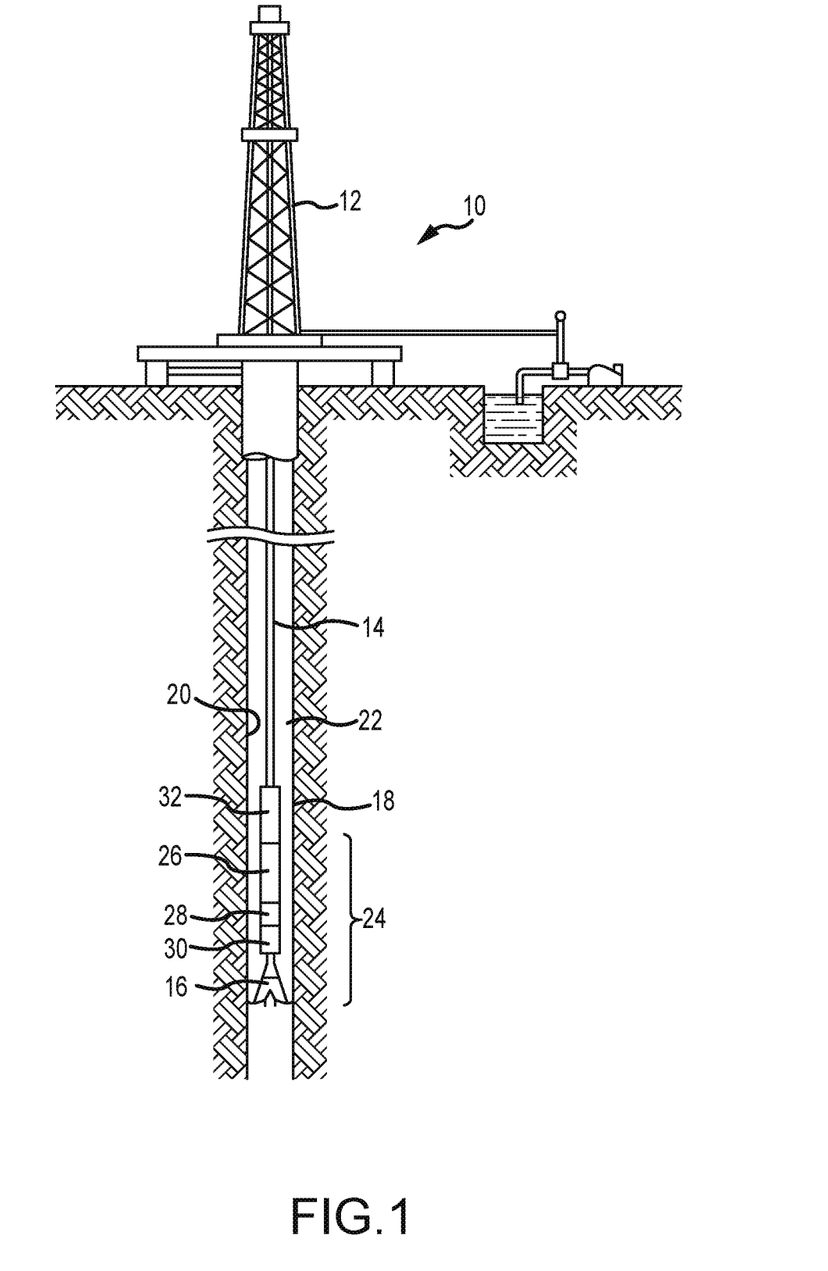
FIG. 1 is a schematic side view of an embodiment of a drilling system, in accordance with embodiments of the present disclosure.

FIG. 1 is a schematic side view of an embodiment of a downhole drilling system 10 (e.g., drilling system) that includes a rig 12 and a drill string 14 coupled to the rig 12. The drill string 14 includes a drill bit 16 at a distal end that may be rotated to engage a formation and form a wellbore 18. In various embodiments, the drill string 14 is formed from one or more tubulars that are mechanically coupled together (e.g., via threads, specialty couplings, or the like). As shown, the wellbore 18 includes a borehole sidewall 20 (e.g., sidewall) and an annulus 22 between the wellbore 18 and the drill string 14. Moreover, a bottom hole assembly (BHA) 24 is positioned at the bottom of the wellbore 18. The BHA 24 may include a drill collar 26, stabilizers 28, or the like.

In operation, drilling mud or drilling fluid is pumped through the drill string 14 and out of the drill bit 16. The drilling mud flows into the annulus 22 and removes cuttings from the face of the drill bit 16. Moreover, the drilling mud may cool the drill bit 16 during drilling operations and further provide pressure stabilization in the wellbore 18. In the illustrated embodiment, the drilling system 10 includes a logging tool 30 that may conduct downhole loggings operations to obtain various measurements. The illustration embodiment further includes a measurement module 32. As will be described below, in various embodiments, the measurement module 32 may include one or more nuclear sources or detectors for interrogation of the formation. For example, the measurement module 32 may include a neutron or gamma ray (e.g., gamma) source that emits radioactive energy into the formation. The radioactive energy may interact with various components of the formation, such as rocks, dirt, hydrocarbon, water, etc. and thereafter facilitate reactions, such as capture, scattering, and the like. The measurement module 32 may further include a radiation detector, which may be sufficiently shielded from the radiation source to enable detection of radioactivity substantially from the formation and not from the source. In various embodiments, as will be described below, the radiation detector may be a neutron detector. However, it should be appreciated that gamma detectors, such as spectroscopy detectors, may also be used. Furthermore, while the illustrated embodiment includes the measurement module 32 on the drill string 14, it should be appreciated that, in various embodiments, the measurement module 32 may be incorporated into a wireline system, a coiled tubing system, or any other downhole investigation system.

Figure 2:
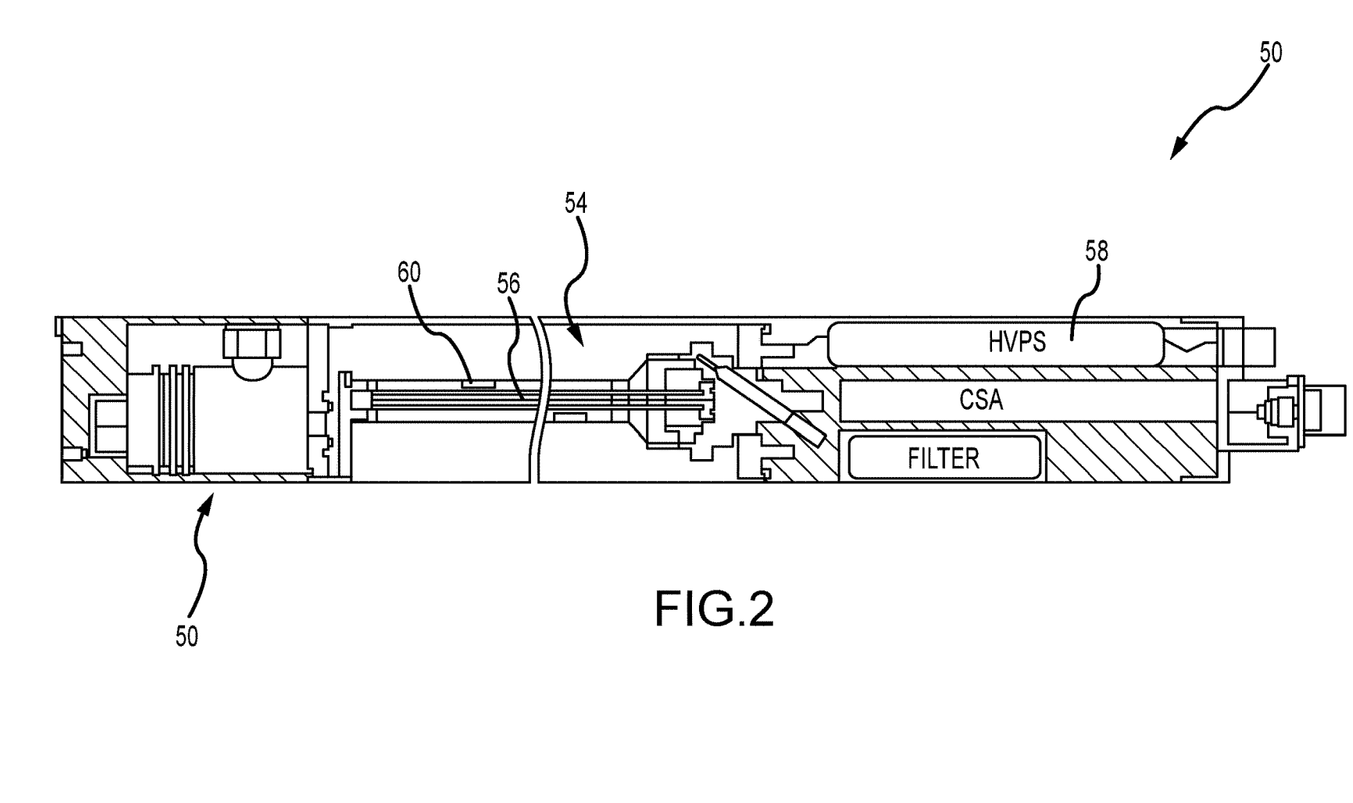
FIG. 2 is a schematic cross-sectional view of an embodiment of a neutron detector, in accordance with embodiments of the present disclosure.

FIG. 2 is a schematic diagram of an embodiment of a neutron detector 50 (e.g., detector), which may be a proportional fill detector or proportional counter. In operation, the detector 50 measures particles of ionizing radiation. For example, a neutron may enter a chamber filled with a gas, collide with an atom of the gas, and ionize it to produce an electron and a positively charged ion. An anode extending through the chamber may be supplied with electrical current, which will increase due to the electric current flow produced by the resulting electron and positively charged ion. Detecting the increase in current flow may be correlated to detection of radiation within the chamber.

In the illustrated embodiment, the neutron detector 50 may be a high pressure Xenon (Xe) detector (e.g., HPXe detector). As will be appreciated, HPXe detectors provide a variety of unique benefits such as high stopping power, a low Fano-factor, mechanical and chemical stability, and low energy for the production of electron-ion pairs. Additionally, HPXe detectors are relatively low cost when compared to comparable detectors, such as High Purity Germanium (HPGe) and Cadmium Zinc Telluride (CZT). Furthermore, HPXe detectors provide the significant benefit over HPGe detectors in that HPXe do not use a supply of cryogenic gas to cool the detector. It should be appreciated that, in various embodiments, HPXe detectors may be used in gamma ray spectroscopy. However, in various embodiments described herein, the HPXe detector may be modified to enable detection of neutrons. Gamma ray shielding may be provided to selectively transmit impinging neutrons and to reject impinging gamma rays.

As will be described below, the addition of a material, or combinations of materials, having a high thermal neutron cross section may be added to the gas chamber to enable detection of thermal neutrons. It should be appreciated that various materials have a high thermal neutron cross section, and as a result, in various embodiments the material added to the detector may have a thermal neutron cross section above a pre-determined threshold. For simplicity, various embodiments described herein will use Boron as the material having the high thermal neutron cross section. Accordingly, it should be appreciated that Boron (or in various embodiments Boron-10) has a thermal neutron cross section at least greater than the threshold. In various embodiments, Boron (which includes a proportion of Boron-10) may be added to the gas chamber to enable detection of thermal neutrons. The illustrated detector 50 includes a housing 52, which may act as a cathode during operation. The housing 52 encloses a gas chamber 54, which as will be described below may include a pseudogas. The pseudogas may be a combination of Xe gas and Boron-containing particles suspended within the Xe gas. Extending through the gas chamber 54 is an anode 56, which receives electrical energy from a power supply 58. The illustrated embodiment further includes a Frisch grid 60 arranged proximate the anode, but it should be appreciated that the Frisch grid 60 is optional and may be omitted in certain embodiments. It should be appreciated that various features of the detector 50 have been omitted for clarity and will not be described herein, such as various insulators, valves, supports, filters, electrical components, and the like.

Naturally occurring Boron (B) has two different forms, Boron-11 (B-11) and Boron-10 (B-10). B-11 occurs with approximately 80.1 percent natural abundance, while B-10 occurs with approximately 19.9 percent natural abundance. B-10 has a substantially higher thermal neutron cross-section, which is directly related to its ability to capture thermal neutrons. That is, a larger neutron cross section is associated with a higher likelihood of neutron capture. Accordingly, B-10 is preferred for neutron detection because the thermal neutron cross section is greater than the cross section for B-11. Certain radiation detectors may utilize enriched quantities of B that have a greater percentage of B-10 than the naturally occurring levels. However, enriching natural B to high percentage of B-10 may be prohibitively expensive.

Furthermore, as described above, in order to provide the cascading reaction for detection within the detector 50, particles for interaction with the ion pairs are required within the gas chamber 54. That is, filling the detector 50 with only B-10 will capture neutrons, but it will not produce the associated ionizing particles utilized for detection with proportional gas counters. Some neutron detectors may include Boron Trifluoride ($BF_3$) consisting of a gas chamber filled with $BF_3$ gas at approximately 0.5 to 1 atmosphere. $BF_3$ is a toxic and/or corrosive gas, and $BF_3$ detectors utilize high voltage requirements (e.g., 1500 to 2000 volts) to detect neutrons. Furthermore, in various embodiments of enriched $BF_3$ may be subject to export controls, further increasing costs because of the costs of compliance.

Figure 3:
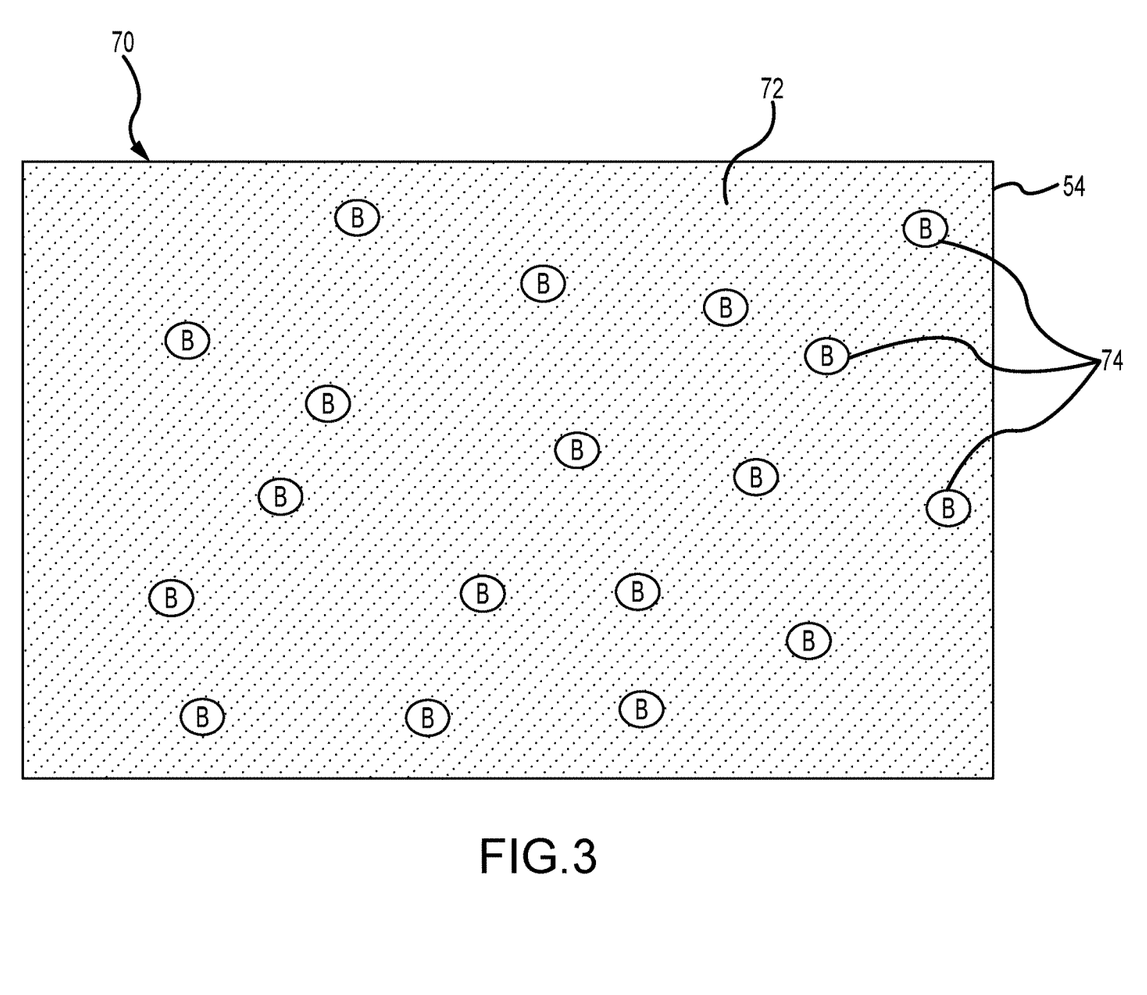
FIG. 3 is a schematic cross-sectional view of an embodiment of a gas chamber with a pseudogas, in accordance with embodiments of the present disclosure.

FIG. 3 is a schematic cross-sectional view of an embodiment of the gas chamber 54 comprising a pseudogas 70 formed at least in part by a combination of a gas 72 and solid particles 74. In various embodiments, the solid particles 74 may be nanoparticles, which are particles having a diameter between 1 and 100 nm. However, it should be appreciated that the particles 74 may not be nanoparticles in various embodiments. It should be appreciated that the particle density, dispersion, size, and general arrangement is for illustrative purposes only and is not intended to limit the disclosure. For example, the particle density and/or ratio of solid particles to gas may be particularly selected based on a variety of factors, such as detector size, operating conditions, costs, and the like. In various embodiments, the solid particles 74 may be Boron-containing and also substantially hollow, spherical particles that "float" or are otherwise suspended within the gas chamber 54. One method of production of Boron-containing nanoparticles 74 is discussed in "Controlled Fabrication of Ultrathin-shell BN Hollow Spheres with Excellent Performance in Hydrogen Storage and Wastewater Treatment" by Lian et al. in Energy & Environmental Science, Issue 5, 2012, which is hereby incorporated by reference. This paper describes 50 nm diameter Boron Nitride microspheres having 2 nm wall thickness so that only 22% of the sphere's total volume is Boron Nitride, which, if solidly-packed, would have 1900 times the Boron per unit volume as the typical $BF_3$ detector. By way of example, the density of solid Boron Nitride is 2.100 g/cc, so the density of these hollow Boron Nitride microspheres is 0.465 g/cc, which, according to the online NIST Chemistry WebBook, equals the density of Xe gas at 783 psi and 25 C or the density of Ar gas at 4120 psi and 25 C. A solid Boron Nitride particle would float in Xe gas at 2800 psi and 25 C or in Ar gas at greater than 145,000 psi and 25 C. The density of pure Boron is 2.46 g/cc so it would float in Xe gas at 7300 psi and 25 C. In various embodiments, particles of low toxicity and low enough mass density (e.g., below a threshold amount) enable gas pressures within reasonable values while still maximizing a number of moles of Boron per unit volume.

The Boron molar density (mol/cc) is the compound's molar density multiplied by the number of Boron atoms in that compound. A compound's molar density (mol/cc) is its mass density (g/cc) divided by its molecular weight (g/mol). The properties of Boron, B, are 2.46 g/cc, 10.811 g/mol, with 0.228 mol/cc of Boron. The properties of Boron Carbide, $B_4C$, are 2.52 g/cc, 55.255 g/mol, with 0.182 mol/cc of Boron. The properties of Boron Nitride, BN, are 2.10 g/cc, 24.817 g/mol, with 0.085 mol/cc of Boron. The properties of Boron Oxide, $B_2O_3$, are 2.46 g/cc, 69.618 g/mol, with 0.071 mol/cc of Boron. Boron Carbide and Boron Nitride have low toxicity but Boron Carbide has the higher molar density of Boron. Hollow spheres of Boron Carbide have been made (J. L. Wang et al., "Boron Carbide Hollow Microspheres Prepared by Polymer Derived Method", Key Engineering Materials, Vol. 726, pp. 159-163, 2017), which are 8.7% solid corresponding to a density of 0.22 g/cc, which would float in Xe at 480 psi at 25 C or in Ar at 1880 psi at 25 C. If the walls of these hollow Boron Carbon spheres were made thicker to equal 22% of the sphere's volume (as was the case for the earlier example of Boron Nitride hollow spheres) then the density would be 0.56 g/cc corresponding to Xe at 845 psi and 25 C and a solidly-packed detector using such Boron Carbide hollow particles would have approximately 4090 times more B-10 than an equivalent $BF_3$ detector.

As used herein, the pseudogas 70 refers to a mixture of gas atoms 72 and solid particles 74, such as the Boron-containing particles. In certain embodiments, properties of the gas atoms 72 and particles 74 may be particularly selected to suspend the particles 74 among the gas atoms 72. In various embodiments, the illustrated gas atoms 72 are Xe atoms, but it should be appreciated that other gases, such as Ar and the like, may be utilized. Xe gas provides the advantage of being non-radioactive, having the highest density of any non-radioactive inert gas, and providing ample atoms for ionization in a proportional gas tube.

In the illustrated embodiment, the Boron-containing particles 74 may be formed such that they have substantially neutral buoyancy relative to the Xe gas 72. That is, the Boron-containing particles 74 may be said to "float" or otherwise settle very slowly within the gas chamber 54, for example over a period of several days or longer. In other words, the density of the Boron-containing particles 74 may be calculated to be approximately equal to the density of the Xe gas 72. Once filled, the volume of the chamber is fixed, which means that the number of moles of trapped gas is fixed and the corresponding mass density of the trapped gas is also fixed. Any increase in temperature will increase the pressure but it will not change the mass density. As will be appreciated, the mass density of the Boron-containing particles 74 may be calculated to be substantially equal to the density of the Xe such that the Boron-containing particles 74 will have neutral buoyancy within the gas chamber 54.

The fraction of solid material in the hollow (or substantially hollow) particles may be calculated from their diameter and wall thickness. Assuming negligible mass density of any gas that may have been trapped inside of the hollow during fabrication, the hollow particle's mass density is the solid fraction multiplied by the mass density of that solid. The number of B-10 nuclei per unit volume may be calculated from the total number of B nuclei per unit volume multiplied by the 19.9% natural abundance of B-10. In this manner, the volume of the Boron-containing particles 74 may be calculated to provide for manufacturing and filling of the gas chamber 54.

As described above, $BF_3$ detectors may be utilized despite the various drawbacks. Accordingly, when designing embodiments of the present disclosure, various properties of B within the $BF_3$ detector may be evaluated. For example, $BF_3$ detectors may have a particular weight fraction of B-10 or B-10 mole density. Accordingly, the same values for the Boron-containing particles 74 may be calculated and compared to $BF_3$ detectors. In various embodiments, utilizing Boron-containing particles 74 may enable significantly more B-10 within the gas chamber 54 than by utilizing $BF_3$ detectors. Furthermore, the Boron-containing particles 74 may be formed from naturally occurring B, rather than enriched B-10, which decreases the cost. In various embodiments, a solidly-packed detector using the Boron-containing particles 74 may have approximately 1900 times more B-10 than an equivalent $BF_3$ detector. As such, the detector 50 of the illustrated embodiment need not be solidly-packed to have adequate B-10 for interaction with neutrons. However, as described above, it should be appreciated that other configurations of Boron-containing particles 74 may have approximately 4000 times more B-10 than an equivalent $BF_3$ detector.

As described above, in various embodiments the gas chamber 54 includes the pseudogas 70 comprising a mixture of both the Xe atoms 72 (e.g., Xe gas, gas) and the Boron-containing particles 74. The Boron-containing particles 74 may be dispersed throughout the gas chamber 54, and need not "fully pack" the gas chamber 54 so as to enable sufficient Xe gas particles 74 for interaction with the ion pairs generated through neutron capture. Accordingly, the Boron-containing particles 74 may be dispersed throughout the Xe gas particles 72 within the gas chamber 54, as shown in the embodiment illustrated in FIG. 3. In various embodiments, the gas chamber 54 may be pressurized to a particular pressure, such as approximately 1000 psi.

It should be appreciated that, when the Boron-containing particles are nanoparticles, then, due to their small size and weight, the settling and collection of the Boron nanoparticles 74 may be significantly reduced or adjusted for. Because particle settling under gravity is a function of aerodynamic size, very small particles (e.g., Aerodynamic Equivalent Diameter, AED, less than 100 nm) can take up to one month to settle out of completely still air. Additionally, gas density may also influence settling time. Accordingly, settling within the gas chamber 54 may be inconsequential for anticipated operations, which are usually completed within a few days. Furthermore, it should be appreciated that the long settling time enables the detector 50 to be remixed automatically by shakes or external forces due to tripping into and out of the wellbore.

Figure 4:
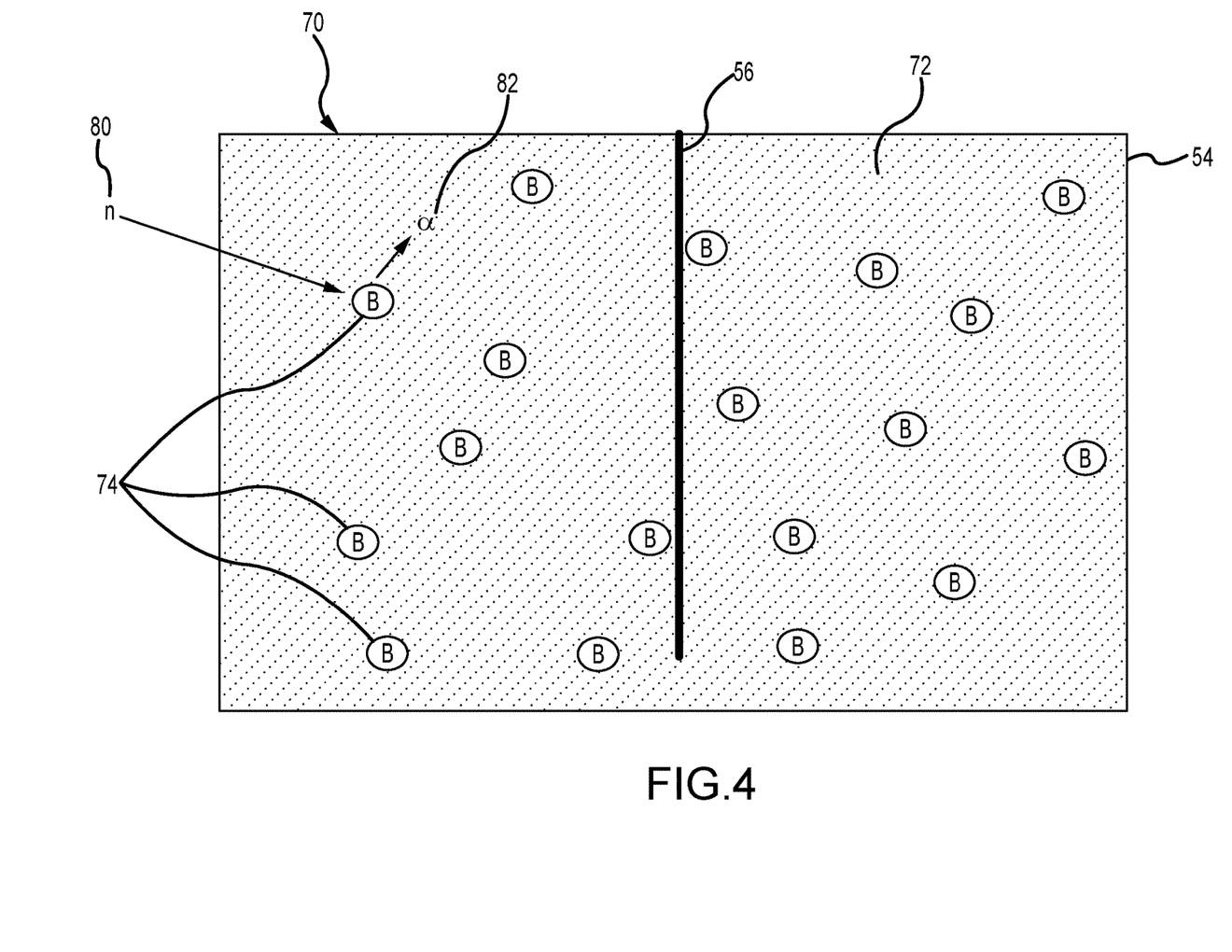
FIG. 4 is a schematic cross-sectional view of an embodiment of a gas chamber with a pseudogas, in accordance with embodiments of the present disclosure.

FIG. 4 is a schematic cross-sectional view of an embodiment of the gas chamber 54 comprising the pseudogas 70. In the illustrated embodiment, a neutron particle 80 interacts with a Boron-containing particle 74 to produce an alpha particle 82. It should be appreciated that a Lithium-7 particle may also be produced due to the capture of the neutron particle 80, but this has been omitted for clarity in the discussion. The energy from the alpha particle 82 interacts with the Xe particles 72 to energize the anode 56, thereby enabling detection of the neutron capture within the detector 50. As described above, by reducing the packing of the Boron-containing particles within the gas chamber 54, additional Xe particles 72 may be included, thereby increasing the available particles for ionization by the release of the alpha particle 82. Accordingly, the detector 50 may be utilized to detect neutrons with reduced costs compared to traditional detectors, such as He-3 or $BF_3$ because the illustrated detector 50 uses solid particles that contain Boron and, generally, the number of moles per unit volume of an element that is part of a solid is far greater than the number of moles per unit volume of that same element if it had existed in the form of a gas. Because the molar density of Boron in a solid is so high compared to a gas, it becomes possible to use unenriched, naturally-occurring Boron, which is less costly than both He-3 and enriched B-10.

Figure 5:
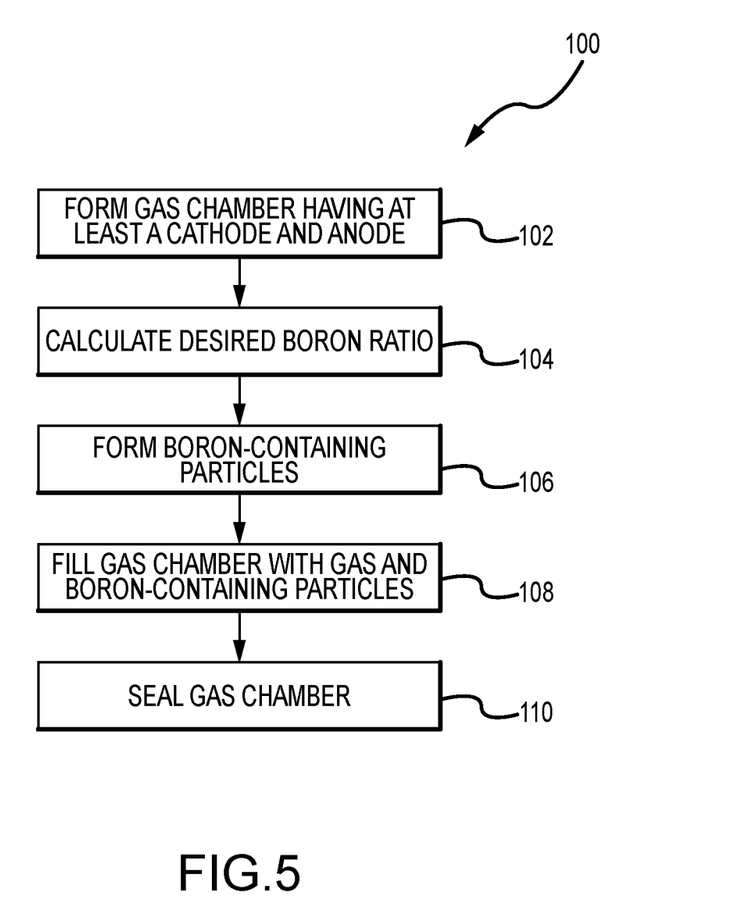
FIG. 5 is a flow chart of an embodiment of a method for forming a neutron detector with a pseudogas, in accordance with embodiments of the present disclosure.

FIG. 5 is a flow chart of an embodiment of a method 100 for preparing a neutron detector. It should be understood that, for any process or method described herein, that there can be additional, alternative, or fewer steps performed in similar or alternative orders, or concurrently, within the scope of the various embodiments unless otherwise specifically stated. The method 100 may begin by forming a gas chamber having at least an anode and cathode (block 102), such as the gas chamber 54, anode 56, and the housing 52 (which may act as a cathode). In other words, a proportional gas counter may be formed using various materials, as will be appreciated by one skilled in the art. The method may continue by calculating the desired boron ratio within the gas chamber (block 104). For example, as described above, the gas chamber may be compared to an equivalent $BF_3$ detector and thereafter a ratio between the two may be calculated. In various embodiments, the ratio of a gas chamber packed solidly to maximum number of Boron-containing particles may be significantly greater than the equivalent $BF_3$ detector, thereby enabling the gas chamber of the embodiments herein to not need to be packed solid with Boron-containing particles and, thereby, provide more than ample space for ionization of the gas in the chamber. Thereafter, the Boron-containing particles may be formed (block 106). The gas chamber is then filled with a gas, such as Xenon, and the Boron-containing particles (block 108). In various embodiments, the size of the Boron-containing particles may be small enough that settling may not be significant over short periods of time, although neutral buoyancy may be obtained in various embodiments to insure that that distribution of suspended solid particles is uniform or substantially uniform in the chamber. Furthermore, a calculated density of the Boron-containing particles may be substantially equal to the gas, thereby enabling the nano-particles to "float" or otherwise be suspended within the gas to generate a pseudogas. Next, the gas chamber is sealed (block 110) to form the gas detector.

Figure 6:
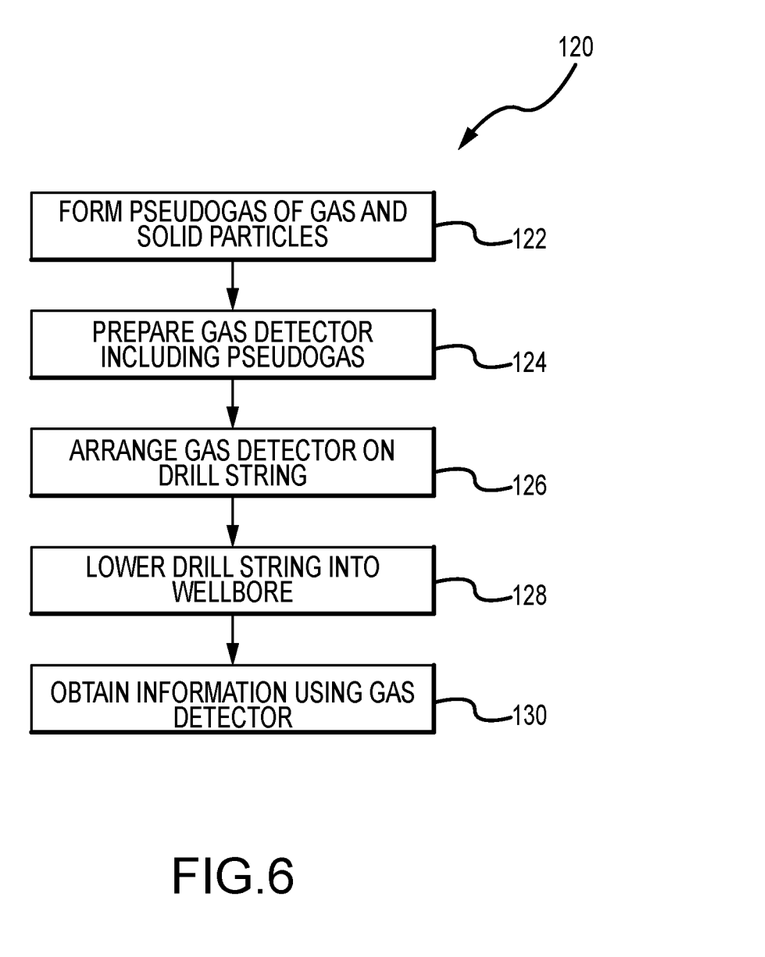
FIG. 6 is a flow chart of an embodiment of a method for performing neutron detection, in accordance with embodiments of the present disclosure.

FIG. 6 is a flow chart of a method 120 for performing downhole operations using a gas detector. In the illustrated embodiment, the method 120 begins with forming a pseudo-gas gas comprising gas and solid particles (block 122). In various embodiments, the pseudogas may be formed between Xe gas and Boron-containing particles, which in various embodiments may be hollow. It should be appreciated that the density of the Boron-containing particles may be substantially equal to the density of the Xe gas such that the Boron-containing particles are substantially suspended or "float" within the Xe gas. In various embodiments, the Boron-containing particles may be have neutral buoyancy within the Xe gas. Next, a proportional gas counter is formed using the pseudogas (block 124). The detector may be arranged on a drill string for conducting downhole operations, such as drilling, logging, measurements, and the like (block 126). The drill string may be lowered into a wellbore (block 128) and the formation may be interrogated with radioactive energy, in certain embodiments. Thereafter, the detector may be used to detect neutron particles emitted from the formation. It should be appreciated that, in other embodiments, the formation may not be interrogated with radioactive energy. The detector may receive information (block 130) corresponding to the neutron activity of the formation. This information may be utilized to analyze and determine various properties of the formation, such as the composition of the formation. In this manner, downhole operations may be performed using a gas detector including a pseudogas.

While various embodiments of the instant application may be directed to oil and gas technologies, for example formation evaluation, it should be appreciated that embodiments of the present disclosure may be deployed in a variety of industries and technology sectors. For example, security and defense industries may utilize embodiments of the present disclosure for screening purposes, for example at international borders, transit centers, shipping areas, and the like. Additionally, in various embodiments, medical devices such as PET/CT and SPECT/MRI instruments may utilize neutron detector technologies. Moreover, scientific research applications, such as neutron scatting beam lines, may benefit from the use of the disclosed neutron detectors. Other potential applications also include industrial monitoring (e.g., personnel, soil, water, etc.), nuclear decommission and inspection, aerospace, and energy.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for detecting neutrons, the system comprising:
   a housing;
   a gas chamber at least partially defined by the housing;
   an anode extending through at least a portion of the gas chamber; and
   a pseudogas arranged within the gas chamber, wherein the pseudogas comprises a mixture of a gas and solid particles.

2. The system of claim 1, wherein the gas is a dense gas.

3. The system of claim 1, wherein the solid particles are Boron-containing particles.

4. The system of claim 1, wherein a density of the gas is substantially equal to a density of the solid particles such that the solid particles are suspended within the gas.

5. The system of claim 1, wherein the housing is a cathode and the anode detects a current change in the anode due at least in part to neutron capture by the solid particles.

6. The system of claim 1, wherein the solid particles are formed from a material having a thermal neutron cross section greater than a threshold amount.

7. The system of claim 1, wherein the proportion of solid particles of the pseudogas does not fully fill the gas chamber.

8. A method for forming a neutron detector, the method comprising:
   forming a gas chamber;
   determining a gas to particle ratio for a pseudogas;
   filling the gas chamber with the pseudogas; and
   sealing the gas chamber.

9. The method of claim 8, wherein forming the gas chamber comprises:
   forming a housing from a neutron-permeable material, the housing being a cathode; and
   arranging an anode to extend at least partially through the gas chamber.

10. The method of claim 8, wherein determining a gas to particle ratio comprises:
    determining a desired mole density; and
    determining a mass density of the particles.

11. The method of claim 8, wherein the gas is a dense gas and the solid particle is a hollow Boron-containing sphere.

12. The method of claim 11, wherein the Boron is naturally occurring Boron.

13. The method of claim 8, further comprising:
    positioning the neutron detector on a downhole tool;
    interrogating an underground formation with radioactive particles; and
    measuring neutron emission from the underground formation.

14. The method of claim 8, further comprising:
    calculating a first density of the gas;
    calculating a second density of the particle, the first density and the second density being substantially similar; and
    forming the particle having the second density.

15. The method of claim 8, further comprising:
suspending the particle within the gas.

16. A system for detecting neutrons, the system comprising:
- a housing forming a cathode of a proportional gas counter;
- a gas chamber formed at least partially by the housing;
- an anode extending partially through the gas chamber; and
- a pseudogas formed from a combination of dense gas and Boron-containing particles positioned within the gas chamber, wherein the Boron-containing particles are arranged to capture incoming neutrons and increase a current at the anode via the production of charged particles from neutron capture.

17. The system of claim 16, wherein the Boron-containing particles are formed as hollow spheres from naturally occurring Boron-containing compounds.

18. The system of claim 16, wherein a density of the dense gas is substantially equal to a density of the Boron-containing particles.

19. The system of claim 16, wherein a diameter of the Boron-containing particles is below a threshold amount to reduce a settling time of the Boron-containing particles.

20. The system of claim 16, wherein the housing is arranged in a downhole formation.

* * * * *